US010889294B2

(12) United States Patent
Schein et al.

(10) Patent No.: US 10,889,294 B2
(45) Date of Patent: Jan. 12, 2021

(54) ASSESSING U-TURN FEASIBILITY (71) Applicant: Ford Global Technologies, LLC, Dearborn, MI (US)

(72) Inventors: Victoria Leigh Schein, Dearborn, MI (US); Jonathan Thomas Mullen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 16/069,921

(22) PCT Filed: Jan. 14, 2016

(86) PCT No.: PCT/US2016/013461
§ 371 (c)(1),
(2) Date: Jul. 13, 2018

(87) PCT Pub. No.: WO2017/123233
PCT Pub. Date: Jul. 20, 2017

(65) Prior Publication Data
US 2018/0370532 A1 Dec. 27, 2018

(51) Int. Cl.
*B60W 30/095* (2012.01)
*B60W 40/04* (2006.01)
(Continued)

(52) U.S. Cl.
CPC .... *B60W 30/0956* (2013.01); *B60W 30/0953* (2013.01); *B60W 30/18009* (2013.01); *B60W 40/04* (2013.01); *B60W 40/06* (2013.01); *B60W 50/14* (2013.01); *G01C 21/34* (2013.01); *G01C 21/3407* (2013.01); *G06F 16/29* (2019.01); *G06K 9/00805* (2013.01);
*G08G 1/09626* (2013.01); *G08G 1/096741* (2013.01); *G08G 1/096775* (2013.01); *G08G 1/166* (2013.01);
(Continued)

(58) Field of Classification Search
CPC ............. B60W 30/0956; B60W 40/06; B60W 30/0953; B60W 30/18009; B60W 50/14; B60W 40/04; B60W 2050/146; B60W 2530/00; B60W 2556/50; B60W 2540/215; B60W 2554/00; G01C 21/34; G01C 21/3407; G08G 1/096775; G08G 1/166; G08G 1/167; G08G 1/09626; G08G 1/096741; G06F 16/29; G06K 9/00805
USPC ........................................................ 701/117
See application file for complete search history.

(56) References Cited

U.S. PATENT DOCUMENTS

6,636,806 B1 * 10/2003 Irie ........................ G01C 21/36
340/990
8,610,595 B1 * 12/2013 Aleteeby .......... G08G 1/096741
340/435
(Continued)

Primary Examiner — Maceeh Anwari
(74) Attorney, Agent, or Firm — Gregory P. Brown; Brooks Kushman P.C.

(57) ABSTRACT

Methods, devices and apparatuses pertaining to U-turn assistance. The method may include detecting an intention of an operator of a vehicle of rendering a U-turn at a location. A computing device may obtain geographic information associated with the U-turn, and assess feasibility of the U-turn at the location based on the geographic information. Further, the computing device may provide a notification to the operator based on the feasibility of the U-turn to assist the operator to operate the U-turn of the vehicle at the location.

9 Claims, 6 Drawing Sheets (51) Int. Cl.
*G01C 21/34* (2006.01)
*G08G 1/0967* (2006.01)
*G08G 1/16* (2006.01)
*G08G 1/0962* (2006.01)
*B60W 40/06* (2012.01)
*G06F 16/29* (2019.01)
*B60W 30/18* (2012.01)
*B60W 50/14* (2020.01)
*G06K 9/00* (2006.01)

(52) U.S. Cl.
CPC ....... *G08G 1/167* (2013.01); *B60W 2050/146* (2013.01)

(56) References Cited

U.S. PATENT DOCUMENTS

| | | | | |
|---|---|---|---|---|
| 2005/0240332 | A1* | 10/2005 | Mori | B60T 8/1755 |
| | | | | 701/72 |
| 2012/0143442 | A1* | 6/2012 | Kim | B62D 5/04 |
| | | | | 701/41 |
| 2012/0173080 | A1* | 7/2012 | Cluff | B62D 15/028 |
| | | | | 701/42 |
| 2013/0311081 | A1* | 11/2013 | Yamakawa | G01C 21/32 |
| | | | | 701/428 |

\* cited by examiner

ASSESSING U-TURN FEASIBILITY

TECHNICAL FIELD

The present disclosure generally relates to traffic safety and, more particularly, to methods and systems for U-turn assistance.

BACKGROUND

A vehicle may not be able to turn completely around in a given area when an object, such as a boat, another vehicle, a trailer or a towable object, is attached to or otherwise towed by the vehicle. The attached object may be several hundred pounds and several meters long, and the vehicle may need to be maneuvered differently than when no object is attached to or towed by the vehicle, especially for certain maneuvers such as a circular turning and stopping. Given these problems, a driver might not know whether a U-turn may be performed with respect to a vehicle at a certain location.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Implementations herein relate to U-turn assistance. A driving assistance system may determine a trajectory for a vehicle at a designated U-turn location. Based on the trajectory, the driving assistance system may use a vehicle sensor system to identify possible obstructions and update the trajectory based on the identified obstructions. If an acceptable trajectory is determined, the driving assistance system may provide assistance with execution of the U-turn. Further, the driving assistance system may modify the trajectory based on real-time vehicle input data collected by the vehicle sensor system.

Figure 1:
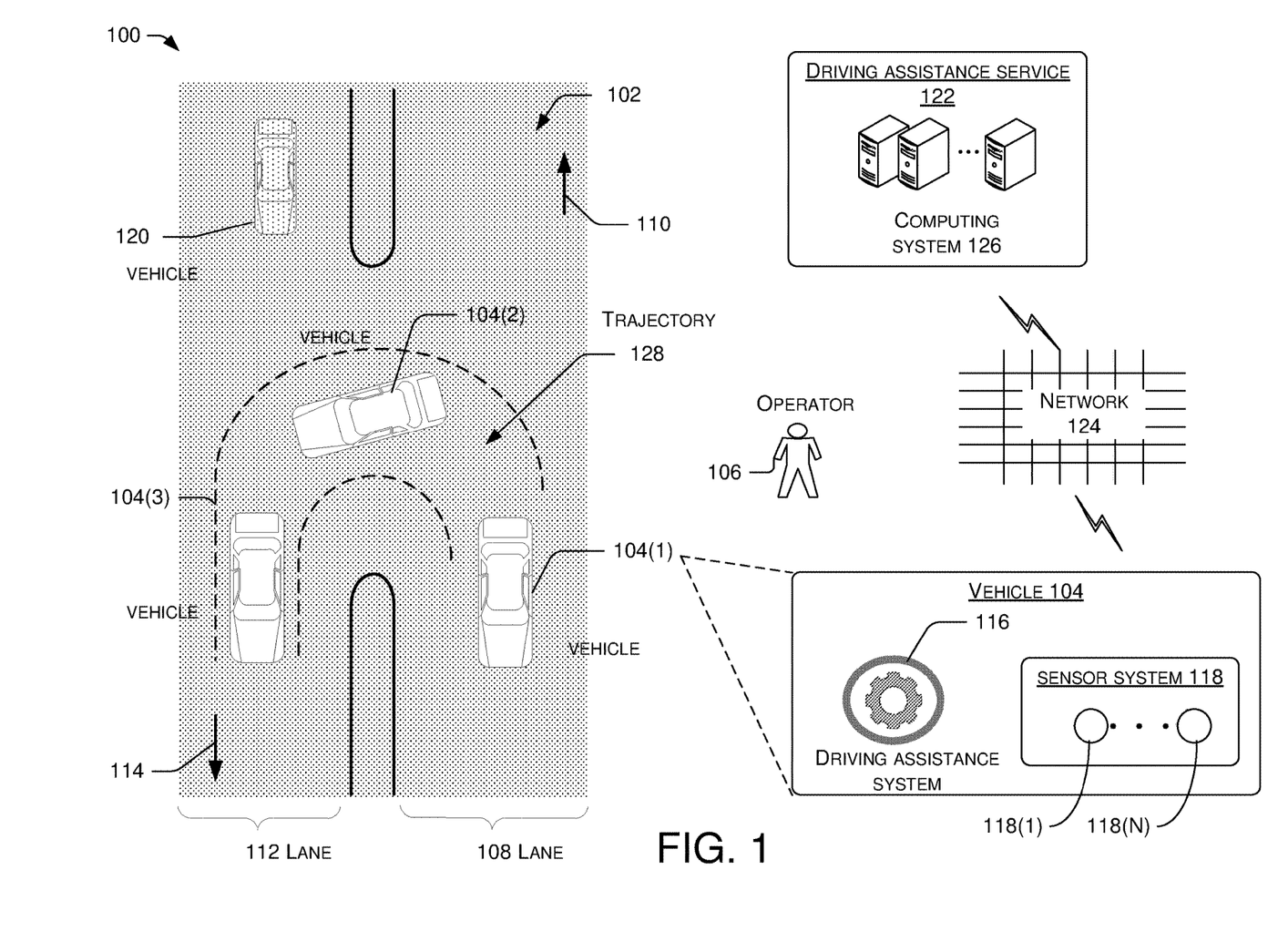
FIG. 1 is a diagram depicting an example environment in which example embodiments of the present disclosure may be implemented.

FIG. 1 illustrates an example environment 100 in which example embodiments of the present disclosure may be implemented. Environment 100 includes a road segment 102 and a vehicle 104 that is operated by an operator 106 to perform a U-turn at road segment 102. In FIG. 1, vehicle images 104(1), 104(2) and 104(3) of vehicle 104 represent vehicle 104 at various locations during the U-turn. The road segment 102 may include a lane 108 for traffic in a first direction 110 and a neighboring lane 112 for traffic in a second direction 114 opposite to first direction 110.

Vehicle 104 may be equipped with a driving assistance system 116 that facilities driving assistance. In some implementations, driving assistance system 116 may be incorporated into at least one of the following systems associated with vehicle 104: a vehicle navigation system, a vehicle infotainment system, or a GPS system. In these instances, certain functions of the driving assistance system 116 may be implemented by one or more of the vehicle navigation system, the vehicle infotainment system, and the GPS system associated with vehicle 104.

In some implementations, driving assistance system 116 may include an interface that is placed within reach of operator 106 such that operator 106 may easily access the interface to launch, trigger or otherwise initiate driving assistance (e.g., U-turn assistance) when operator 106 is operating vehicle 104. For example, one push of a button or touch on the interface may indicate that there is an attempted U-turn at a specific location and, in some implementations, this may trigger or otherwise launch driving assistance system 116.

Driving assistance system 116 may collect vehicle information or data of vehicle 104 using a sensor system 118. Sensor system 118 may include multiple sensors 118(1)-118(N), where N is a positive integer greater than 1, such as a laser radar, a vehicle speed sensor, a front-facing camera, a side-facing camera, a side-facing radar, and/or a blinker detector. These sensors may detect environmental parameters and vehicle parameters, and provide geographic information regarding the road segment 102 as well as vehicle information of vehicle 104 to driving assistance system 116.

A laser radar of sensor system 118 may be mounted on the front of vehicle 104 and used for obstacle detection to assist vehicle safely through environments. For example, the laser radar may determine where potential obstacle(s) exist(s) in the environment of road segment 102 and where vehicle 104 is in relation to potential obstacle(s). A vehicle speed sensor of sensor system 118 may detect a traveling speed of vehicle 104 based on, for example, a rotational speed of a wheel of vehicle 104. A front facing camera of sensor system 118 may be mounted on the front of vehicle 104 to detect a road environment ahead of vehicle 104. The front facing camera may generate images of a road segment ahead of vehicle 104 and transmit the images to driving assistance system 116. A blinker detector of sensor system 118 may detect an actuation state of blinkers or direction indicators by operator 106 with respect to vehicle 104. Using sensor system 118, driving assistance system 116 may collect real-time data related to, for example, obstructions and oncoming traffic (e.g., vehicle 120) at road segment 102.

In some implementations, sensor system 118 may include attachable sensors, which may be temporarily attached to vehicle 104. For example, the attachable sensors may be placed on a plurality of locations of vehicle 104 (e.g., multiple corners of vehicle 104). The attachable sensors may include ultrasonic or capacitive sensors with a certain attaching mechanism (e.g., magnets, stick on, and mounted). Once the sensors are positioned, a reader (e.g., driving assistance system 116) in vehicle 104 may receive signals from the sensors via, for example, Bluetooth, Near Field Communication (NFC), infrared and/or Wi-Fi and then provide information indicative of sensed parameters to driving assistance system 116.

In some implementations, driving assistance system 116 may communicate with a remote driving assistance service 122 via a network 124. Network 124 may include wired and/or wireless networks that enable communications between the various computing devices described in environment 100. In some embodiments, network 124 may include local area networks (LANs), wide area networks (WAN), mobile telephone networks (MTNs), and other types of networks, possibly used in conjunction with one another, to facilitate communication between the various computing devices.

Driving assistance service 122 may include a set of related software and/or hardware components that may be reused for different purposes, and may function together with user-defined policies to provide driving assistance to operator 106. In some implementations, driving assistance service 122 may include a computing system 126 (e.g., one or more servers) which may be configured to facilitate the driving assistance associated with driving assistance system 116. For example, computing system 126 may provide vehicle information of vehicle 104 to driving assistance system 116 via network 124.

In some implementations, driving assistance system 116 may detect an intention of operator 106 of vehicle 104 of rendering a U-turn at the road segment 102. Driving assistance system 116 may obtain geographic information associated with the U-turn and assess feasibility of the U-turn based on the geographic information. Further, driving assistance system 116 may provide a notification to operator 106 based on the feasibility of the U-turn to assist operator 106 to perform the U-turn with vehicle 104. For example, driving assistance system 116 may determine a trajectory of the U-turn at road segment 102 based on the geographic information, and assess the feasibility of the U-turn at road segment 102 using the trajectory.

In some implementations, driver assistance system 116 may record in a buffer reading from sensor system 118 on approach to a potential U-turn location or while going by a potential U-turn location. The recorded readings may be used later to evaluate whether a potential planned is collision-free. The recorded readings may be transferred through network 124, processed by driver assistance service 122 then stored on computing system 126.

Figure 2:
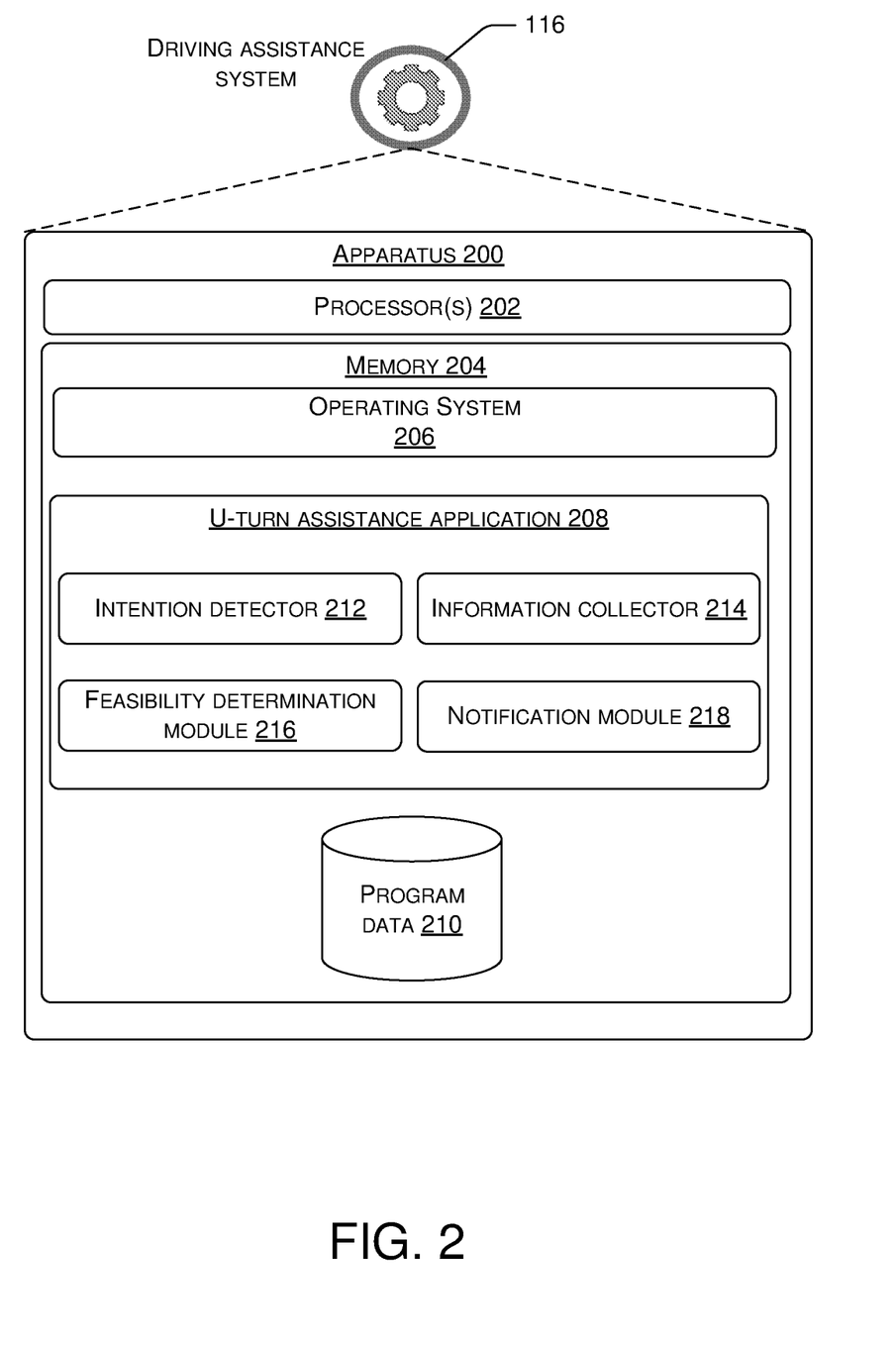
FIG. 2 is a block diagram depicting an example apparatus in accordance with an embodiment of the present disclosure.

FIG. 2 illustrates an example apparatus 200 in accordance with an embodiment of the present disclosure. Apparatus 200 may be an example implementation of driving assistance system 116 and, as depicted in FIG. 2, shows additional details of driving assistance system 116. Apparatus 200 may include at least those components shown in FIG. 2 as well as other components not shown, which may include additional modules, kernels, data, and/or hardware.

Apparatus 200 may include processor(s) 202 and memory 204. Memory 204 may store various modules, applications, programs, or other data, including one or more sets of instructions that, when executed by processor(s) 202, cause processor(s) 202 to perform the operations described herein pertaining to U-turn assistance. Processor(s) 202 may include one or more central processing units (CPU), one or more graphics processing units (GPU) and one or more application-specific integrated circuits (ASIC).

Apparatus 200 may include additional data storage devices (removable and/or non-removable) including one or more computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. A system memory, a removable storage and a non-removable storage may be examples of computer storage media. Computer storage media may include, but is not limited to, random-access memory (RAM), read-only memory (ROM), electrically erasable programmable read-only memory (EEPROM), flash memory or other memory technology, compact disc (CD)-ROM, digital versatile disks (DVD), or other optical storage, magnetic cassettes, magnetic tape, magnetic disk storage or other magnetic storage devices, or any other medium that can be used to store the desired information and which can be accessed by apparatus 200. Any such computer storage media may be part of apparatus 200. Moreover, the computer-readable media may include computer-executable instructions that, when executed by processor(s) 202, perform various functions and/or operations described herein.

In some implementations as shown in FIG. 2, memory 204 may store one or more sets of instructions associated with an operating system 206, a U-turn assistance application 208 and program data 210. The U-turn assistance application 208 may include various modules such as an intention detector 212, an information collector 214, a feasibility determination module 216, and a notification module 218.

Intention detector 212 may be configured to detect an intention of operator 106 of vehicle 104 of rendering a U-turn, e.g., at road segment 102. In some implementations, trends of driving intention may be detected based on one or more activities or operations of operator 106 of vehicle 104 by intention detector 212. For instance, intention detector 212 may detect various trends of driving intention such as the intention to change lane on which vehicle 104 travels by traveling to a neighboring lane and the intention to make a U-turn by performing a 180° rotation to reverse the heading of vehicle 104.

In some implementations, intention detector 212 may detect via an interface a predetermined event indicating the intention of the operator 106 of rendering the U-turn. For example, the interface may be a vehicle accessory including a human interface device that is user-friendly and accessible to operator 106. In some implementations, intention detector 212 may automatically detect an intention of operator 106 of rendering a U-turn based at least on a state of blinkers of vehicle 104 and/or a speed of vehicle 104. For example, when intention detector 212 detects actuation of left blinkers/blinkers of vehicle 104 and a decrease in the speed of vehicle 104, intention detector 212 may determine that operator 106 may intend to make a U-turn.

Information collector 214 may be configured to obtain geographic information associated with the U-turn. For example, information collector 214 may determine or collect geographic information of a starting point and an endpoint that are desired for the U-turn at road segment 102. Geographic information refers to vehicle information and behavior that are related to a geographic location of vehicle 104. Geographic location refers to a relative location (e.g., San Francisco, 500 Sea World Dr, San Diego, Calif. 92109, etc.) as a displacement for another site or an absolute location using a coordinate system (e.g., a spherical coordinate system or a world geodetic system). In some implementations, the geographic information may include images of a road segment ahead of vehicle 104 that are collected by sensor system 118. These images may be used to generate an assistance instruction provided to operator 106 to assist operator 106 to operate the U-turn.

Based on geographic information, information collector 214 may determine trajectory 128 of the U-turn at the location based on the geographic information of the starting point and the endpoint desired for the U-turn. In some implementations, there may be more than one trajectories that are generated based on the geographic information and/or vehicle information. In these instances, a trajectory may be selected from multiple candidate trajectories and may be constantly modified for U-turn feasibility assessment based on real-time data received from sensor system 118 with respect to the environment of road segment 102.

Further, information collector 214 may determine one or more obstructions of the trajectory 128 at road segment 102 using sensor system 118 and/or pre-stored geographic information associated with road segment 102. An obstruction refers to an object that impedes or prevents movement of vehicle 104 along the trajectory for U-turn. For example, possible obstructions may include a stationary object and a moving object. A stationary object may include a bump, a wall, a curb, a traffic sign, and any obstacle or blockage on a driving path of vehicle 104. A moving object may include an oncoming vehicle (e.g., vehicle 120) and/or a human or cyclist moving toward vehicle 104 on the driving path of vehicle 104.

In some implementations, information collector 214 may generate a U-turn map that indicates one or more obstructions identified in relation to trajectory 128, and may facilitate presentation of the U-turn map to operator 106.

Feasibility determination module 216 may be configured to assess feasibility of the U-turn at road segment 102 based on the geographic information. For example, feasibility determination module 216 may assess feasibility of the U-turn at road segment 102 based on trajectory 128. The feasibility of the U-turn may indicate how likely vehicle 104 is capable of making a U-turn at the current location (e.g., safe, likely safe or not safe).

In some implementations, feasibility determination module 216 may determine a candidate operation of the U-turn at the location based on the geographic information and vehicle information of vehicle 104 using a path planning algorithm. Further, feasibility determination module 216 may generate a feasible operation of the U-turn by modifying the candidate operation of the U-turn. A feasible operation may include, for example, a trajectory to make the U-turn, speed(s) of vehicle 104 when traveling along the trajectory, and any other features of vehicle 104 necessary for rendering the U-turn.

Vehicle information includes various static parameters (e.g., a length of vehicle 104, a width of vehicle 104, and vehicle tow ratings), control parameters (e.g., steering parameters, braking parameters, and throttle parameters), and/or performance parameters (e.g., a speed, a heading, and a location) associated with vehicle 104. For example, based on the length and width of vehicle 104, driving assistance system 116 may calculate a turning radius of vehicle 104.

A turning radius of a vehicle is the radius of a circular turn that vehicle 104 is capable of making. For example, the turning radius of a U-turn may refer to the smallest circular turn that vehicle 104 may make without hitting a street curb with a wheel of vehicle 104 or without scraping a wall around the street by vehicle 104. The turning radius of vehicle 104 may be calculated based on parameters of vehicle 104. In some implementations, the parameters of vehicle 104 may include the maximum steer angle of the front wheels of vehicle 104 and the wheelbase vehicle 104. The wheelbase of vehicle 104 refers to a distance between the front wheels of vehicle 104 and the rear wheels of vehicle 104.

Notification module 218 may be configured to generate and provide a notification to operator 106 based on the feasibility of the U-turn to assist the operator to operate the U-turn of vehicle 104 at road segment 102. The notification may be either or both audible and visible to operator 106. For example, notification module 218 may present the feasible operation of the U-turn to operator 106 via a user interface such as a dashboard display panel. In these instances, driving assistance system 116 may monitor the operation of the U-turn of vehicle 104 performed by operator 106, and provide feedback to operator 106 or assist the operation of the U-turn based on the monitoring. In some implementations, a candidate operation of the U-turn may include geographic information of a starting point of the U-turn and an endpoint of the U-turn, as illustrated in FIG. 3.

Figure 3:
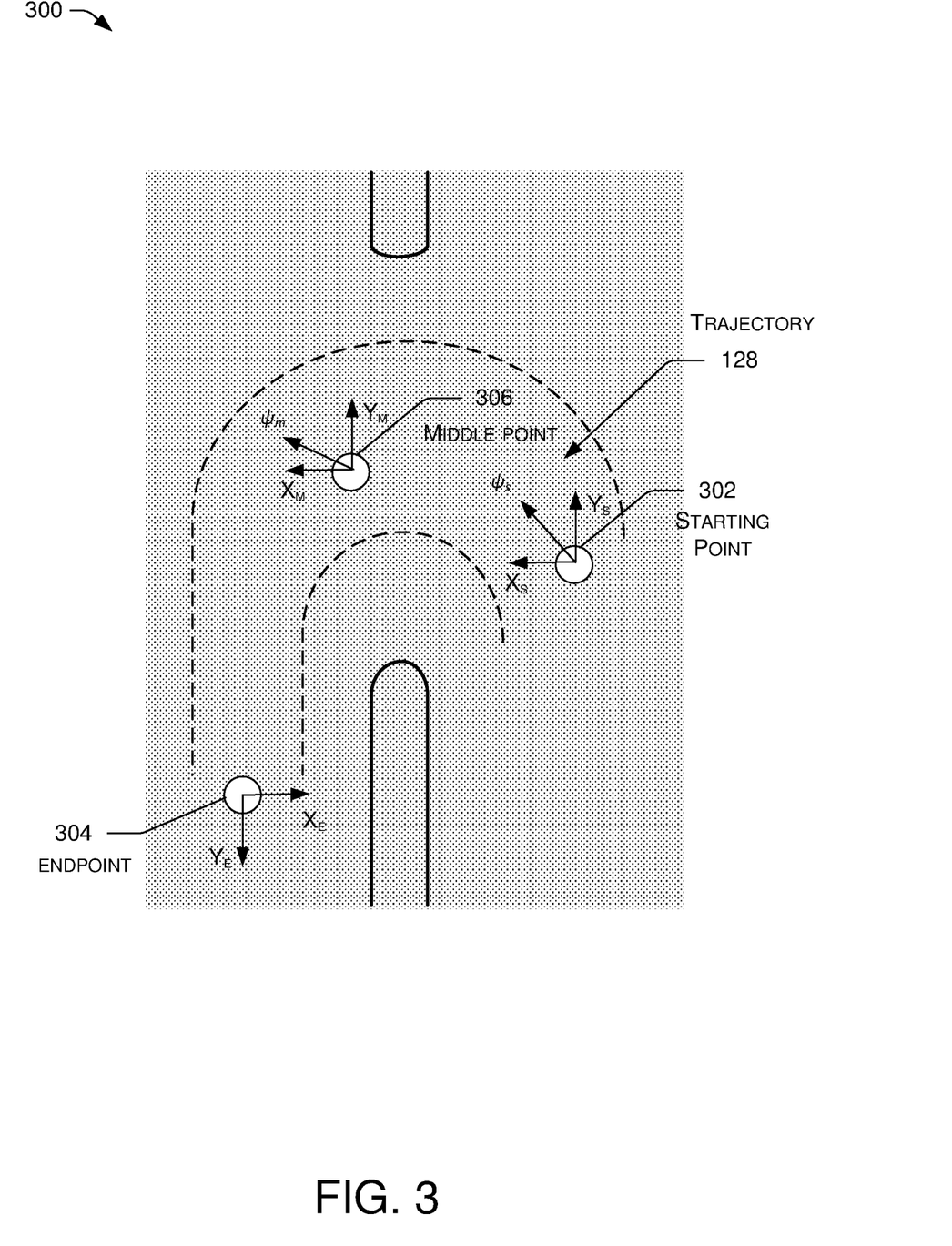
FIG. 3 is a diagram depicting an example scheme in which example embodiments of the present disclosure may be implemented.

FIG. 3 is a diagram depicting an example scheme 300 in which example embodiments of the present disclosure may be implemented. Scheme 300 includes a portion of road segment 102 and trajectory 128, which includes a driving path or map that vehicle 104 may follow through space from a starting point to a predetermined endpoint as a function of time. For example, the driving path may include a driving path in which vehicle 104 may avoid obstructions and stay within lane boundaries from a starting point 302 to a middle point 306 and to an endpoint 304 of a U-turn. Starting point 302, middle point 306 and endpoint 304 correspond to vehicle image 104(1), vehicle image 104(2), and vehicle image 104(3) of vehicle 104 shown in FIG. 1, respectively. In these instances, locations of starting point 302, middle point 306 and endpoint 304 may be represented by coordinates $(X_s, Y_s)$, $(X_m, Y_m)$ and $(X_e, Y_e)$, and may be used for determination of trajectory 128.

In some implementations, driving assistance system 116 may determine trajectory 128 of the U-turn at road segment 102 based on the geographic information of starting point 302 and endpoint 304. Driving assistance system 116 may further monitor a speed of vehicle and a current location $(X_m, Y_m)$, and determine one or more desired speeds of vehicle 104 along trajectory 128.

Driving assistance system 116 may further monitor headings (e.g., $\psi_m$ and $\psi_s$) of vehicle 104 along the trajectory, and generate a feasible operation of the U-turn by modifying the candidate operation of the U-turn. For example, driving assistance system 116 may modify the candidate operation of the U-turn based on information of a coming traffic, one or more real-time inputs from vehicle 104, and/or one or more real-time inputs from operator 106.

In some implementations, a route planning algorithm (e.g., A-Star graph routing algorithm) may be implemented to determine more than one sequence of links (e.g., possible paths), including U-turns and non-U-turns, connecting a source node (e.g., current location) and a destination node (e.g., destination). In these instances, the sequence or path among multiple sequences/paths with the lower/lowest cost may be selected.

Figure 4:
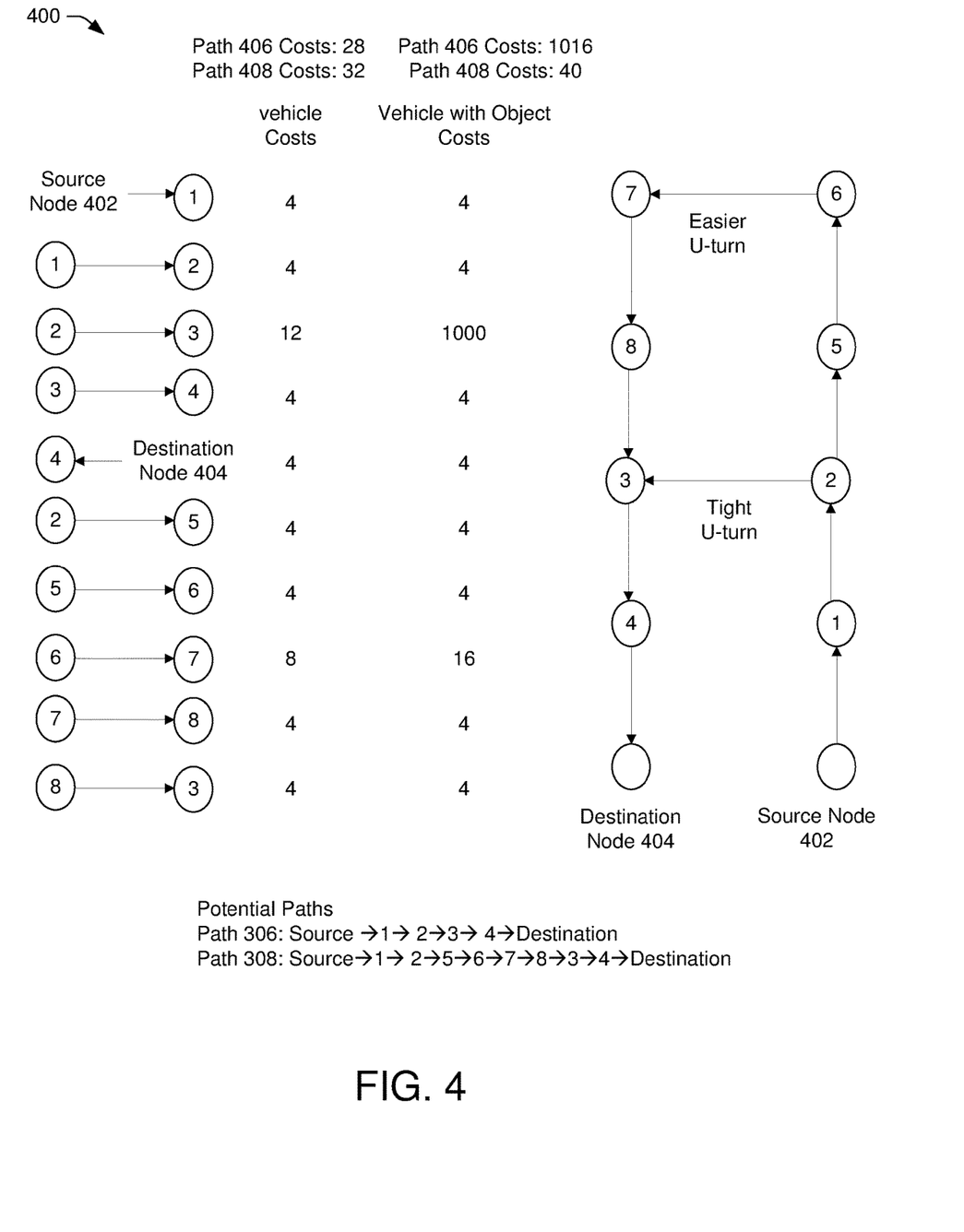
FIG. 4 is a diagram depicting implementation of an example route planning algorithm in accordance with an embodiment of the present disclosure.

For example, as illustrated in FIG. 4, two sequences of links connecting a source node 402 and a destination node 406 may correspond to a path 406 and a path 408, respectively. Using the route planning algorithm, driving assistance system 116 may calculate the total costs of link costs of each potential path, namely path 406 and path 408. For example, the total costs associated with path 406 for a passenger vehicle may be 28 and the total costs associated with path 408 for the passenger vehicle may be 32. Accordingly, driving assistance system 116 may select path 406 instead of path 408 as the feasible route for the passenger vehicle. As another example, the total costs associated with path 406 for a vehicle towing an object may be 1016 and the total costs associated with path 408 for the vehicle may be 40. Accordingly, driving assistance system 116 may select path 408 instead of path 406 as the feasible route for the vehicle towing an object.

In some implementations, certain information associated with vehicle 104 and a plurality of paths may be further utilized to determine a feasible route using, for example, a rapidly exploring random tree (RRT) path-planning algorithm. In these instances, the certain information may include allowable configurations of one or more paths associated with the feasible route, and constraints (e.g., the max steering angle) associated with the one or more paths and vehicle 104. Further, driving assistance system 116 may obtain information to evaluate whether a candidate path from one configuration to another is collision-free. For example, the configuration associated with a vehicle may include a geographic coordinate of a location of the vehicle and a direction that the vehicle is facing. For a truck with a trailer, the configuration may include a geographic coordinate of a location of the vehicle, a direction the truck is facing, and an angle of the trailer relative to the truck.

Figure 5:
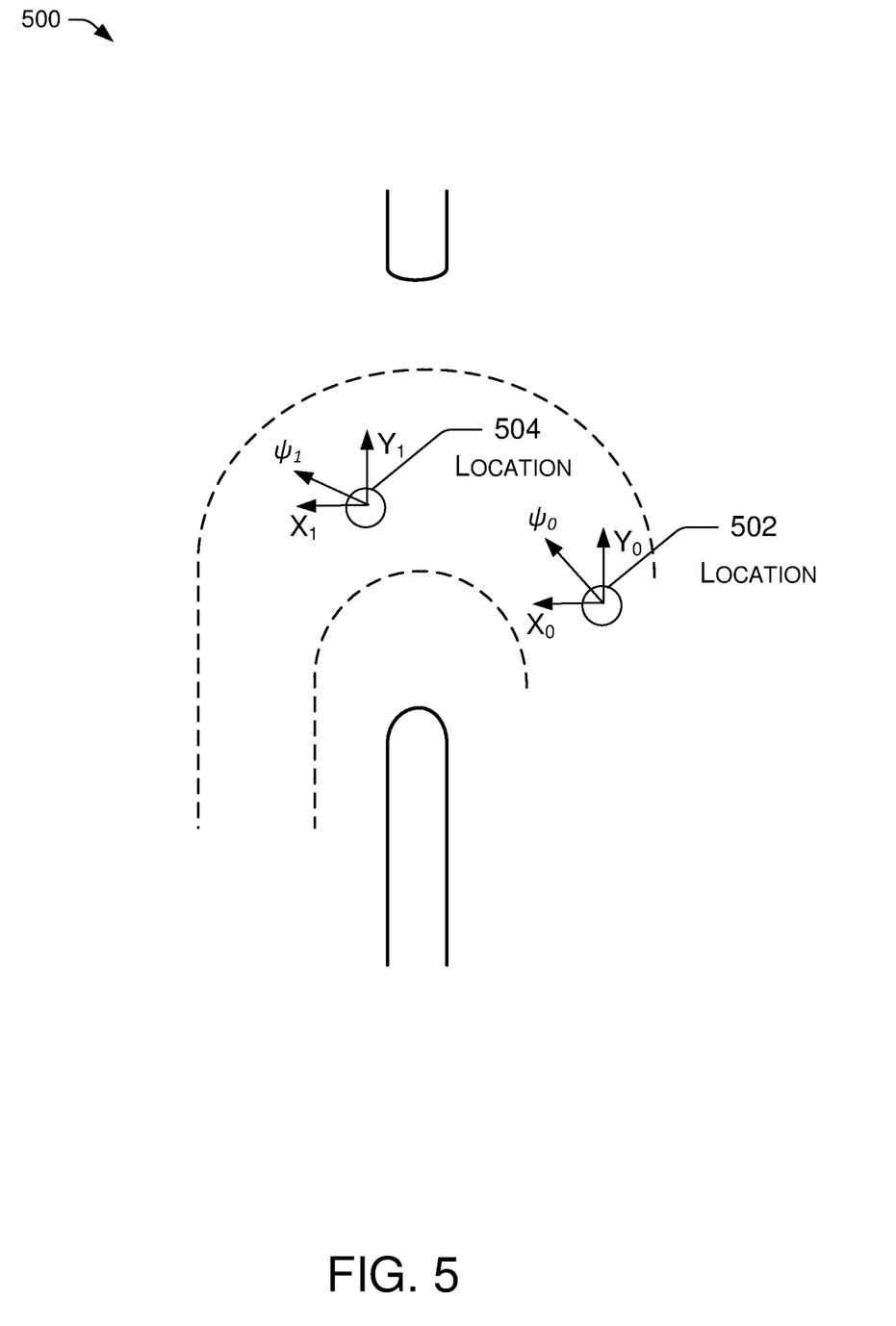
FIG. 5 is another diagram depicting implementation of an example path planning algorithm in accordance with an embodiment of the present disclosure.

For example, as illustrated in FIG. 5, vehicle 104 may make a U-turn from a location 502 to a location 504. A path planning algorithm may be implemented to compute collision-free path while ignoring constraints, and then transform the path to one that obeys constraints. Assume a collision computation function C exits as follows: C: (x, y)×(x, y)→{0,1}, driving assistance system 116 may determine that the path between location 502 to location 504 is collision-free for certain vehicle parameters (e.g., length, width, trailer parameters, etc.) of vehicle 104. In these instances, driving assistance system 116 may determine certain dynamics using the following formulas, wherein x represents an easting coordinate, y represents a northing coordinate, θ represents a vehicle heading, φ represents a steering angle, x' represents a derivative in the easting coordinate with respect to time, y' represents a derivative in the northing direction with respect to time, θ' represents a derivative in the steering angle with respect to time, u represents velocity of a vehicle, and L represents wheelbase of the vehicle, assuming $u=u_0$ and constrain steering angle $|\phi|<\Phi$.

$$x' = u\cos\theta$$
$$y' = u\sin\theta$$
$$\theta' = \frac{u}{L}\tan\phi$$

Figure 6:
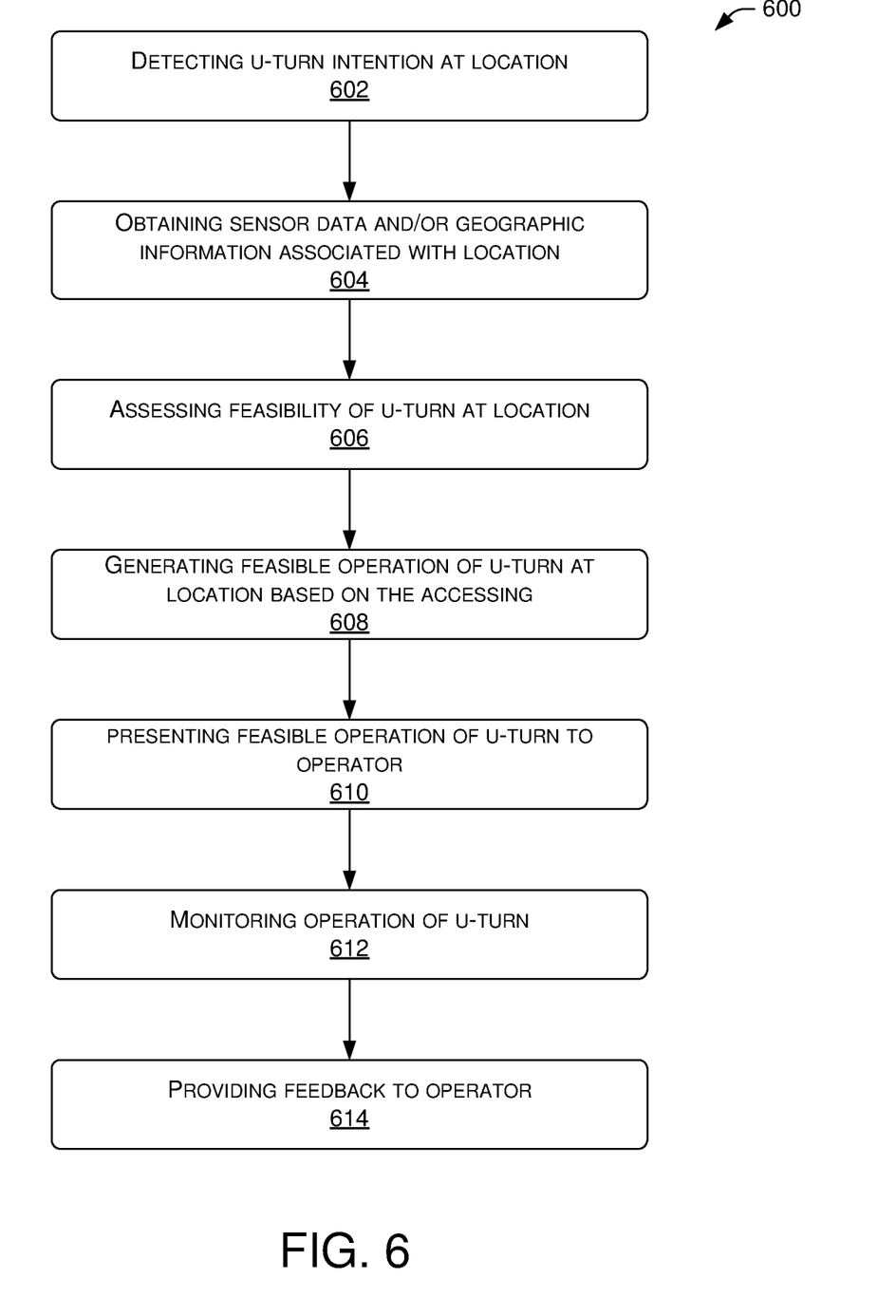
FIG. 6 is a flowchart of an example process in accordance with an embodiment of the present disclosure.

FIG. 6 illustrates an example process 600 in accordance with an embodiment of the present disclosure. Process 600 may include one or more operations, actions, or functions shown as blocks such as 602, 604, 606, 608, 610, 612 and 614. Although illustrated as discrete blocks, various blocks of process 400 may be divided into additional blocks, combined into fewer blocks, or eliminated, depending on the desired implementation. Process 600 may be implemented by driving assistance system 116 and apparatus 200. For simplicity of description and not limiting the scope of the present disclosure, process 600 is described below in the context of apparatus 200 as an example implementation of driving assistance system 116. Process 600 may begin with block 602.

At 602, processor(s) 202 may detect an intention of an operator of vehicle 104 of rendering a U-turn at road segment 102. For example, processor(s) 202 may detect a predetermined event indicating the intention of operator 106 of rendering the U-turn.

At 604, processor(s) 202 may obtain sensor data and/or geographic information associated with the U-turn. For example, processor(s) 202 may determine or collect the geographic information of starting point 302 and endpoint 304 at road segment 102. Alternatively or additionally, processor(s) 202 may receive sensor data (e.g., from sensor system 118).

In some implementations, processor(s) 202 may determine trajectory 128 of the U-turn at road segment 102 based on the geographic information of starting point 302 and endpoint 304. For example, processor(s) 202 may identify one or more obstructions in trajectory 128 of the U-turn at road segment 102. Further, processor(s) 202 may generate a U-turn map that indicates the identified one or more obstructions in relation to trajectory 128 and present the U-turn map to operator 106.

At 606, processor(s) 202 may assess feasibility of the U-turn at road segment 102 based on the geographic information. For example, processor(s) 202 may assess the feasibility of the U-turn at road segment 102 based on trajectory 128. In some implementations, processor(s) 202 may determine a candidate operation of the U-turn at road segment 102 based on the geographic information and vehicle information of vehicle 104 using a path planning algorithm. For example, the vehicle information of vehicle 104 may include a length and a width of vehicle 104 and a turning radius of vehicle 104.

In some implementations, the candidate operation of the U-turn may include the geographic information of a desired starting point of the U-turn (e.g., starting point 302) and a desired endpoint (e.g., endpoint 304) of the U-turn, trajectory 128, one or more desired speeds of vehicle 104 along the trajectory 128, and/or desired headings of vehicle 104 along trajectory 128.

At 608, processor(s) 202 may generate a feasible operation of the U-turn by modifying the candidate operation of the U-turn. For example, processor(s) 202 may modify the candidate operation of the U-turn based on information of a coming traffic, one or more real-time inputs from vehicle 104, one or more real-time inputs from operator 106, or a combination thereof.

At 610, processor(s) 202 may present the feasible operation of the U-turn to operator 106. The feasible operation of the U-turn may include a drivability map that includes obstructions and a driving path in which vehicle 104 may avoid the obstructions and stay in lane boundaries in performing the U-turn.

At 612, processor(s) 202 may monitor an operation of the U-turn performed by operator 106. For example, processor(s) 202 may communicate with sensor system 118 to collect real-time information of vehicle 104 and to monitor the operation of the U-turn.

At 614, processor(s) 202 may provide feedback to operator 106 or assisting the operation of the U-turn based on the monitoring. In some implementations, processor(s) 202 may further receive user feedback that includes choices that operator 106 has made with respect to opinions on the U-turn maneuver (e.g., successfully, partially successfully, or unsuccessfully). Based on the user feedback, drive assistance system 116 may modify one or more algorithms associated with assistance of U-turns.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising: detecting an intention of an operator of a vehicle of rendering a U-turn at a location; obtaining geographic information associated with the U-turn; assessing feasibility of the U-turn at the location based on the geographic information; providing a notification to the operator based on the feasibility of the U-turn to assist the operator to operate the U-turn of the vehicle at the location; wherein the assessing of the feasibility of the U-turn at the location based on the geographic information comprises assessing the feasibility of the U-turn at the location based on the trajectory; further comprising: identifying one or more obstructions in the trajectory of the U-turn at the location; generating a U-turn map that indicates the identified one or more obstructions in relation to the trajectory; and presenting the U-turn map to the operator; and wherein the identifying of the one or more obstructions in the trajectory of the U-turn at the location comprises identifying the one or more obstructions in the trajectory of the U-turn at the location using one or more sensors attached to the vehicle, pre-stored geographic information associated with the location, or a combination thereof.

2. The method of claim 1, wherein the obtaining of the geographic information associated with the U-turn comprises:
   determining or collecting geographic information of a starting point of the U-turn and an endpoint of the U-turn at the location; and
   determining a trajectory of the U-turn at the location based on the geographic information of the starting point and the endpoint.

3. The method of claim 1, where the assessing of the feasibility of the U-turn at the location comprises:
   determining a candidate operation of the U-turn at the location based on the geographic information and vehicle information of the vehicle using a path planning algorithm, the candidate operation of the U-turn comprising:
      geographic information of a desired starting point of the U-turn and a desired endpoint of the U-turn;
      a trajectory of the U-turn at the location based on the geographic information of the desired starting point and the desired endpoint;
      one or more desired speeds of the vehicle along the trajectory; and
      a heading of the vehicle along the trajectory; and
   generating a feasible operation of the U-turn by modifying the candidate operation of the U-turn.

4. The method of claim 3, wherein the modifying of the candidate operation of the U-turn comprises modifying the candidate operation of the U-turn based on information of a coming traffic at the location, one or more real-time inputs from the vehicle, one or more real-time inputs from the operator, or a combination thereof.

5. The method of claim 3, further comprising:
   presenting the feasible operation of the U-turn to the operator,
   monitoring an operation of the U-turn performed by the operator, and
   providing feedback to the operator or assisting the operation of the U-turn based on the monitoring.

6. The method of claim 3, wherein the vehicle information of the vehicle comprises a length and a width of the vehicle and a turning radius of the vehicle.

7. The method of claim 1, wherein the detecting of the intention of the operator of rendering the U-turn comprises detecting a predetermined event indicating the intention of the operator of rendering the U-turn.

8. The method of claim 1, wherein the detecting of the intention of the operator of rendering the U-turn comprises receiving, from an interface, a U-turn assistance request for rendering the U-turn.

9. One or more non-transitory computer-readable media storing computer-executable instructions that, when executed on one or more processors, causes the one or more processors to perform acts comprising: detecting a predetermined event indicating an intention of an operator of a vehicle of rendering a U-turn at a location; obtaining geographic information associated with the U-turn; assessing feasibility of the U-turn at the location based on the geographic information; providing a notification to the operator based on the feasibility of the U-turn to assist the operator to operate the U-turn of the vehicle at the location; wherein the obtaining of the geographic information associated with the U-turn comprises: determining or collecting geographic information of a starting point of the U-turn and an endpoint of the U-turn at the location; determining a trajectory of the U-turn at the location based on the geographic information of the starting point and the endpoint, and wherein the assessing of the feasibility of the U-turn at the location based on the geographic information comprises assessing the feasibility of the U-turn at the location based on the trajectory; wherein the acts further comprise: identifying one or more obstructions in the trajectory of the U-turn at the location; generating a U-turn map that indicates the identified one or more obstructions in relation to the trajectory; and presenting the U-turn map to the operator; wherein the identifying of the one or more obstructions in the trajectory of the U-turn at the location comprises identifying the one or more obstructions in the trajectory of the U-turn at the location using one or more sensors attached to the vehicle, pre-stored geographic information associated with the location, or a combination thereof.

* * * * *